(12) United States Patent
Nagata et al.

(10) Patent No.: US 12,742,929 B2
(45) Date of Patent: Sep. 22, 2026

(54) OPTICAL COMPONENT

(71) Applicant: Murata Manufacturing Co., Ltd., Nagaokakyo (JP)

(72) Inventors: Masaki Nagata, Nagaokakyo (JP); Yasuhiro Shimizu, Nagaokakyo (JP); Naoya Mori, Nagaokakyo (JP); Kazuho Shimada, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 436 days.

(21) Appl. No.: 18/400,348

(22) Filed: Dec. 29, 2023

(65) Prior Publication Data

US 2024/0134174 A1 Apr. 25, 2024
US 2024/0231063 A9 Jul. 11, 2024

Related U.S. Application Data

(63) Continuation of application No. PCT/JP2022/016584, filed on Mar. 31, 2022.

(30) Foreign Application Priority Data

Aug. 26, 2021 (JP) ................................ 2021-137739

(51) Int. Cl.
*G02B 6/12* (2006.01)
*G02B 5/20* (2006.01)
*G02B 5/22* (2006.01)

(52) U.S. Cl.
CPC ......... *G02B 6/12007* (2013.01); *G02B 5/208* (2013.01); *G02B 6/12002* (2013.01);
(Continued)

(58) Field of Classification Search
CPC ...................... G02B 6/12002; G02B 6/12007; G02B 5/208; G02B 5/22
See application file for complete search history.

(56) References Cited

U.S. PATENT DOCUMENTS 5,811,191 A 9/1998 Neuman
5,948,131 A 9/1999 Neuman
(Continued)

FOREIGN PATENT DOCUMENTS

CN 1134555 A 10/1996
CN 1441266 A 9/2003
(Continued)

OTHER PUBLICATIONS

English translation of written opinion for PCT/JP2022/016584, dated Jun. 28, 2022. (Year: 2022).*
(Continued)

*Primary Examiner* — Michael Stahl
(74) *Attorney, Agent, or Firm* — ArentFox Schiff LLP

(57) ABSTRACT

An optical component including: a first block having a first refractive index and a first reflective surface; a first light absorbing member containing a first metal ion that absorbs light having a first specific wavelength and has a second refractive index different from the first refractive index; a first buffer layer between and in contact with each of the first light absorbing member and the first block, and having a third refractive index having a value between the first refractive index and the second refractive index, wherein the first light absorbing member, the first buffer layer, and the first block are arranged in this order in a first direction such that first block reflects light traveling in the first direction in a second direction different from the first direction on the first reflective surface.

20 Claims, 8 Drawing Sheets

(52) U.S. Cl.
CPC ...... *G02B 5/22* (2013.01); *G02B 2006/12109* (2013.01); *G02B 2006/12126* (2013.01)

(56) References Cited

U.S. PATENT DOCUMENTS

| | | | | |
|---|---|---|---|---|
| 6,236,786 | B1 * | 5/2001 | Aoki | G02B 6/43 385/14 |
| 7,068,871 | B2 * | 6/2006 | Sugama | G02B 6/12002 385/14 |
| 7,580,605 | B2 | 8/2009 | Ishida et al. | |
| 7,869,671 | B2 | 1/2011 | Ishida et al. | |
| 2003/0161573 | A1 | 8/2003 | Ishida et al. | |
| 2004/0223682 | A1 | 11/2004 | Ding et al. | |
| 2006/0251849 | A1 | 11/2006 | Blauvelt et al. | |
| 2007/0062221 | A1 | 3/2007 | Ishida et al. | |
| 2009/0277228 | A1 | 11/2009 | Ishida et al. | |
| 2013/0094075 | A1 * | 4/2013 | Saitoh | G02B 5/0833 359/350 |
| 2020/0326491 | A1 | 10/2020 | Psaila et al. | |

FOREIGN PATENT DOCUMENTS

| | | | | |
|---|---|---|---|---|
| CN | 202782003 | U | | 3/2013 |
| JP | 2001004810 | A | | 1/2001 |
| JP | 2002169045 | A | | 6/2002 |
| JP | 2003255166 | A | | 9/2003 |
| JP | 2004-235182 | A | * | 8/2004 |
| JP | 2007334318 | A | | 12/2007 |
| JP | 2010113157 | A | | 5/2010 |
| JP | 2011053302 | A | | 3/2011 |
| JP | 2021508089 | A | | 2/2021 |

OTHER PUBLICATIONS

International Search Report in PCT/JP2022/016584, mailed Jun. 28, 2022, 4 pages.

Elisa et al., "Optical characterization of the phosphate glasses containing pair transition ions", Opt Quant Electron, vol. 39, 2007, pp. 523-531.

* cited by examiner 10
n1
n3
n2
n5
n4
REFRACTIVE INDEX
POSITION
16
L2 L1
14b
12a
Sa
Sb
12b
14a
U,DIR1
R,DIR2,DIR5
D,DIR4
L,DIR3,DIR6
B
F 10d
n1
n3
n2
n5
n6
n7
n4
REFRACTIVE INDEX
POSITION
L2 L1
16
17
12a
14b 14c
Sb
Sa
14a
12b
U,DIR1
R,DIR2,DIR5
D,DIR4
L,DIR3,DIR6
B F

OPTICAL COMPONENT

CROSS REFERENCE TO RELATED APPLICATIONS

The present application is a continuation of International application No. PCT/JP2022/016584, filed Mar. 31, 2022, which claims priority to Japanese Patent Application No. 2021-137739, filed Aug. 26, 2021, the entire contents of each of which are incorporated herein by reference.

TECHNICAL FIELD

The present invention is an optical component that changes a light path.

BACKGROUND ART

As an invention related to a conventional optical component, an optical path-converting block described in Japanese Patent Application Laid-Open No. 2011-53302 (hereinafter "Patent Document 1") is known. The optical path-converting block includes a block body, a first reflecting groove, a second reflecting groove, a first lens, and a second lens. The block body has a cubic shape. The first lens is provided on the front surface of the block body. The second lens is provided on the back surface of the block body. The first reflecting groove and the second reflecting groove are provided inside the block body. The first reflecting groove is located behind the first lens. The second reflecting groove is located in front of the second lens. The first reflecting groove is located above the second reflecting groove. Thus, light having passed through the first lens is reflected downward by the first reflecting groove. The light reflected by the first reflecting groove is reflected backward by the second reflecting groove. The light reflected by the second reflecting groove passes through the second lens. As described above, the optical path-converting block described in Patent Document 1 can change the path of light.

SUMMARY OF THE INVENTION

Meanwhile, in the field of optical components such as the optical conversion block described in Patent Document 1, there is a demand for inhibiting noise from being mixed in light used for optical communication.

Therefore, an object of the present invention is to provide an optical element capable of inhibiting noise from being mixed in light used for optical communication.

An optical component according to an embodiment of the present invention includes: a first block having a first refractive index and having a first reflective surface; a first light absorbing member containing a first metal ion configured to absorb light having a first specific wavelength, the first light absorbing member having a second refractive index different from the first refractive index; and a first buffer layer between and in contact with each of the first light absorbing member and the first block, the first buffer layer having a third refractive index having a value between the first refractive index and the second refractive index, wherein the first light absorbing member, the first buffer layer, and the first block are arranged in this order in a first direction such that the first block reflects light traveling in the first direction in a second direction different from the first direction on the first reflective surface, or the first block reflects light traveling in a third direction opposite to the second direction in a fourth direction opposite to the first direction on the first reflective surface.

According to the present invention, it is possible to inhibit noise from being mixed in light used for optical communication.

DETAILED DESCRIPTION OF THE PREFERRED EMBODIMENTS

Embodiment

[Structure of Optical Component 10]

Figure 1:
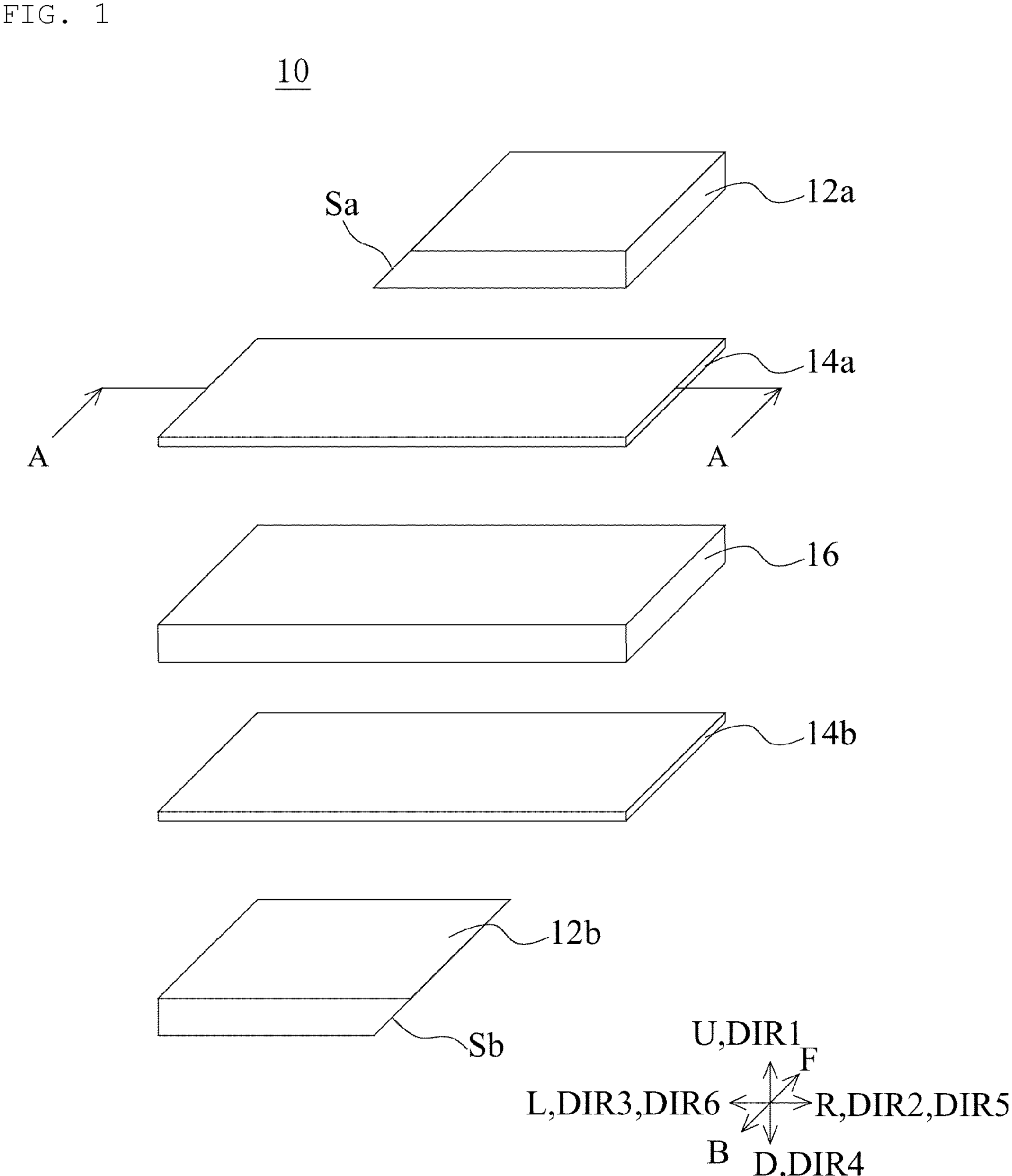
FIG. 1 is an exploded perspective view of an optical component 10.
Figure 2:
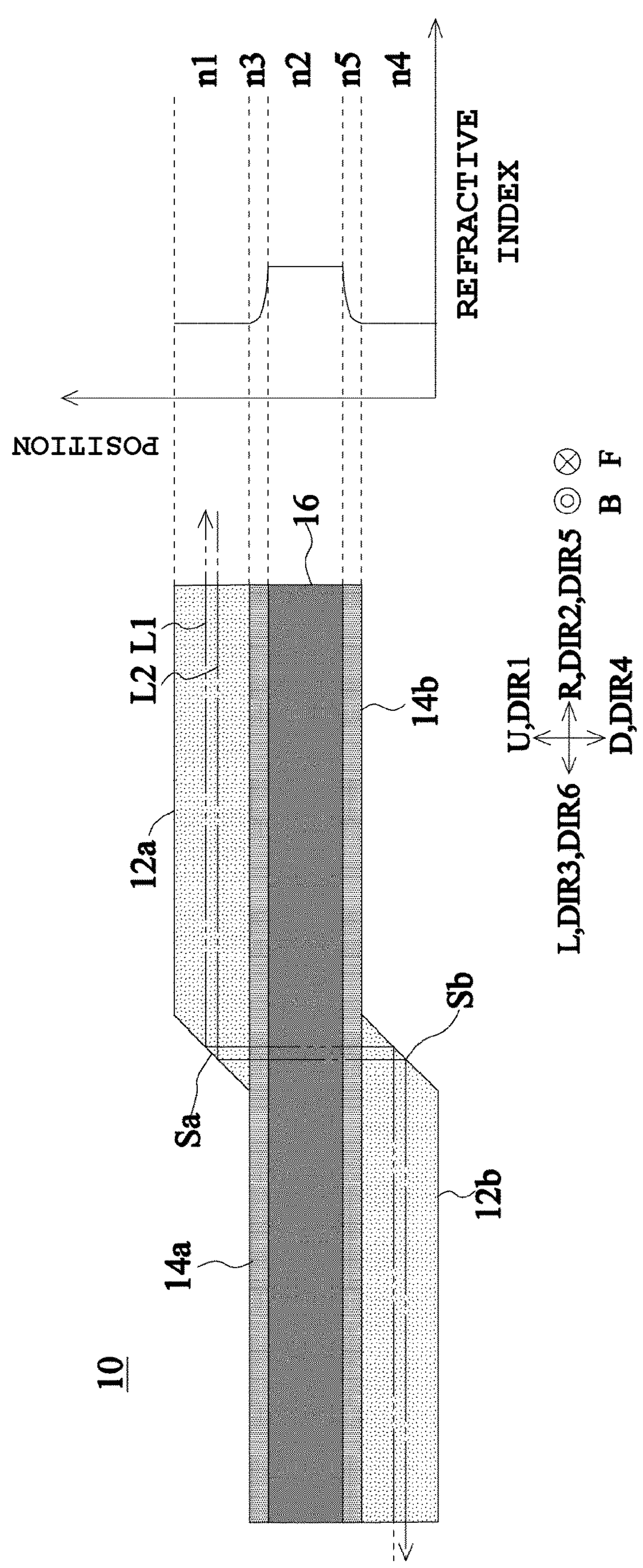
FIG. 2 is a sectional view of the optical component 10 taken along the line A-A.

Hereinafter, a structure of an optical component 10 according to an embodiment of the present invention will be described with reference to the drawings. FIG. 1 is an exploded perspective view of the optical component 10. FIG. 2 is a sectional view of the optical component 10 taken along the line A-A. The size of each member in FIGS. 1 to 8 is an example. Therefore, the actual size relationship between members may be different from the illustrated size relationship.

In the present specification, directions are defined as follows. A direction in which a first block 12*a*, a first buffer layer 14*a*, a first light absorbing member 16, a second buffer layer 14*b*, and a second block 12*b* are arranged is defined as an up-down direction. The upward direction is defined as a first direction DIR1. The downward direction is defined as a fourth direction DIR4. When the optical component 10 is viewed in the up-down direction, the direction in which the first block 12*a* and the second block 12*b* are arranged is defined as a left-right direction. The left direction is defined as a third direction DIR3 and a sixth direction DIR6. The right direction is defined as a second direction DIR2 and a fifth direction DIR5. The direction orthogonal to the up-down direction and the left-right direction is defined as a front-back direction. The up-down direction, the left-right direction, and the front-back direction in the present specification are directions defined for convenience of description. Therefore, the up-down direction, the left-right direction, and the front-back direction in the present specification may not coincide with the up-down direction, the left-right direction, and the front-back direction in actual use of the optical component 10.

Hereinafter, X and Y represent components or members of the optical component 10. In the present specification, each part of X is defined as follows unless otherwise specified. A front part of X means the front half of X. A back part of X means the back half of X. A left part of X means the left half of X. A right part of X means the right half of X. An upper part of X means the upper half of X. A lower part of X means the lower half of X.

In addition, in the present specification, the expression "X is located above Y." means that X is located directly above Y. Therefore, X overlaps Y when viewed in the up-down direction. However, it is sufficient that at least a part of X overlaps Y when viewed in the up-down direction. This definition also applies to directions other than the upward direction.

In addition, in the present specification, the expression "X is located higher than Y." means that X is located directly above Y or X is located obliquely above Y. Therefore, X may or may not overlap Y when viewed in the up-down direction. This definition also applies to directions other than the upward direction.

The optical component 10 is an element for changing a light path. The optical component 10 includes the first block 12*a*, the second block 12*b*, the first buffer layer 14*a*, the second buffer layer 14*b*, and the first light absorbing member 16. The second block 12*b*, the second buffer layer 14*b*, the first light absorbing member 16, the first buffer layer 14*a*, and the first block 12*a* are arranged in this order in the upward direction (first direction DIR1). The second block 12*b*, the left part of the second buffer layer 14*b*, the left part of the first light absorbing member 16, and the left part of the first buffer layer 14*a* overlap one another when viewed in the up-down direction. The right part of the second buffer layer 14*b*, the right part of the first light absorbing member 16, the right part of the first buffer layer 14*a*, and the first block 12*a* overlap one another when viewed in the up-down direction. The first buffer layer 14*a* is in contact with the first light absorbing member 16 and the first block 12*a*. The second buffer layer 14*b* is in contact with the first light absorbing member 16 and the second block 12*b*.

The first block 12*a* is a glass plate having an upper main surface and a lower main surface. Therefore, the material of the first block 12*a* is glass in which the main element in the chemical composition is Si. The glass is, for example, quartz glass or borosilicate glass. Here, the glass in which the main element in the chemical composition is Si means glass in which the element that accounts for the largest mass percentage in the chemical composition is Si. The first block 12*a* has a first refractive index n1. The first block 12*a* has a first reflective surface Sa. The first reflective surface Sa is a left side surface of the first block 12*a*. The first reflective surface Sa forms an angle of 45° with respect to the lower main surface of the first block 12*a*. Therefore, the normal line of the first reflective surface Sa extends toward the upper left direction.

The first light absorbing member 16 is a glass plate having an upper main surface and a lower main surface. Therefore, the material of the first light absorbing member 16 is glass in which the main element in the chemical composition is Si. The glass is, for example, quartz glass or borosilicate glass. However, the first light absorbing member 16 contains first metal ions that absorb light having a first specific wavelength. The first specific wavelength is, for example, 850 nm to 1,675 nm. A wavelength of 850 nm to 1,675 nm is a wavelength of light used in general optical communication. In the present embodiment, the first specific wavelength is 1,250 nm and/or 1,350 nm. The first metal ions are, for example, metal ions having an absorption spectrum in the visible light region, such as $Ti^{3+}$, $V^{4+}$, $Cr^{3+}$, $Mn^{2+}$, $Fe^{2+}$, $Fe^{3+}$, $Ni^{2+}$, and $Cu^{2+}$. Such a first light absorbing member 16 has a second refractive index n2 different from the first refractive index n1. In the present embodiment, the second refractive index n2 is larger than the first refractive index n1. This is because the first metal ions have an effect of increasing the second refractive index n2 of the first light absorbing member 16.

The thickness (size) of the first light absorbing member 16 in the up-down direction (first direction DIR1) as described above is smaller than the wavelength of light passing through the first light absorbing member 16 in light traveling in the upward direction (first direction DIR1) or light traveling in the downward direction (fourth direction DIR4). In the light traveling in the upward direction (first direction DIR1) or the light traveling in the downward direction (fourth direction DIR4), the light passing through the first light absorbing member 16 is light having a wavelength of light used for general optical communication. As described above, the wavelength of light used in general optical communication is 850 nm to 1,675 nm. Therefore, for example, the thickness of the first light absorbing member 16 in the up-down direction is smaller than 200 nm. The thickness of the first light absorbing member 16 in the up-down direction is 10 nm or more. The value 10 nm is the minimum value of the thickness in the up-down direction of the first light absorbing member 16 that can be manufactured.

The first buffer layer 14*a* is a glass plate having an upper main surface and a lower main surface. Therefore, the material of the first buffer layer 14*a* is glass in which the main element in the chemical composition is Si. The glass is, for example, quartz glass or borosilicate glass. However, the first buffer layer 14*a* contains the first metal ions. Such a first buffer layer 14*a* has a third refractive index n3 having a value between the first refractive index n1 and the second refractive index n2. Specifically, the third refractive index n3 is larger than the first refractive index n1 and smaller than the second refractive index n2. Therefore, the content of the first metal ions in the first buffer layer 14*a* is lower than the content of the first metal ions in the first light absorbing member 16. In the present embodiment, the third refractive index n3 continuously decreases toward the first block 12*a* in the upward direction. Therefore, in the first buffer layer 14*a*, the concentration of the first metal ions decreases as approaching the first block 12*a* in the upward direction (first direction DIR1). The third refractive index n3 at the upper main surface of the first buffer layer 14*a* is equal to the first refractive index n1. The third refractive index n3 at the lower main surface of the first buffer layer 14*a* is equal to the second refractive index n2.

The thickness (size) of the first buffer layer 14*a* in the up-down direction (first direction DIR1) as described above is longer than the first specific wavelength. The first specific wavelength is within the wavelength range of light used in general optical communication. The first specific wavelength is therefore, for example, 850 nm to 1,675 nm. Therefore, for example, the thickness of the first buffer layer 14*a* in the up-down direction is 850 nm or more.

The first buffer layer 14*a* is produced by immersing plate glass in a molten metal ion salt to allow metal ions to penetrate into the glass. The metal ions are the first metal ions. At this time, the metal ion salt is brought into contact with only the lower main surface of the plate glass. The third refractive index n3 is thus caused to continuously decrease toward the first block 12*a* in the upward direction.

The second block 12*b* is a glass plate having an upper main surface and a lower main surface. Therefore, the material of the second block 12*b* is glass in which the main element in the chemical composition is Si. The glass is, for example, quartz glass or borosilicate glass. The second block 12*b* has a fourth refractive index n4 different from the second refractive index n2. In the present embodiment, the fourth refractive index n4 is equal to the first refractive index n1. The second block 12*b* has a second reflective surface Sb. The second reflective surface Sb is a right side surface of the second block 12*b*. The second reflective surface Sb forms an angle of 45° with respect to the upper main surface of the second block 12*b*. Therefore, the normal line of the second reflective surface Sb extends toward the lower right direction. The second reflective surface Sb overlaps the first reflective surface Sa as viewed in the up-down direction.

The second buffer layer 14*b* is a glass plate having an upper main surface and a lower main surface. Therefore, the material of the second buffer layer 14*b* is glass in which the main element in the chemical composition is Si. The glass is, for example, quartz glass or borosilicate glass. However, the second buffer layer 14*b* contains the first metal ions. Such a second buffer layer 14*b* has a fifth refractive index n5 having a value between the fourth refractive index n4 and the second refractive index n2. Specifically, the fifth refractive index n5 is larger than the fourth refractive index n4 and smaller than the second refractive index n2. Therefore, the content of the first metal ions in the second buffer layer 14*b* is lower than the content of the first metal ions in the first light absorbing member 16. In the present embodiment, the fifth refractive index n5 continuously decreases toward the second block 12*b* in the downward direction. Therefore, in the second buffer layer 14*b*, the concentration of the first metal ions decreases as approaching the second block 12*b* in the downward direction (second direction DIR2). The fifth refractive index n5 at the lower main surface of the second buffer layer 14*b* is equal to the fourth refractive index n4. The fifth refractive index n5 at the upper main surface of the second buffer layer 14*b* is equal to the second refractive index n2.

The thickness (size) of the second buffer layer 14*b* in the up-down direction (first direction DIR1) as described above is longer than the first specific wavelength. Therefore, for example, the thickness of the second buffer layer 14*b* in the up-down direction is 850 nm or more.

The second buffer layer 14*b* is produced by immersing plate glass in a molten metal ion salt to allow metal ions to penetrate into the glass. The metal ions are the first metal ions. At this time, the metal ion salt is brought into contact with only the upper main surface of the plate glass. The fifth refractive index n5 is thus caused to continuously decrease toward the second block 12*b* in the downward direction.

The glass included in the material of the first block 12*a*, the glass included in the material of the second block 12*b*, the glass included in the material of the first buffer layer 14*a*, the glass included in the material of the second buffer layer 14*b*, and the glass included in the material of the first light absorbing member 16 are glasses having the same main composition.

Next, a path of light used for optical communication in the optical component 10 will be described with reference to FIG. 2. A first path L1 and a second path L2 exist in the path of light used for optical communication in the optical component 10.

In the first path L1, light traveling in the right direction (fifth direction DIR5) enters the second block 12*b* through the left side surface of the second block 12*b*. The second block 12*b* reflects the light traveling in the right direction (the fifth direction DIR5 different from the first direction DIR1) toward the upward direction (first direction DIR1) on the second reflective surface Sb. The light reflected by the second reflective surface Sb travels in the upward direction, passes through the second buffer layer 14*b*, the first light absorbing member 16, and the first buffer layer 14*a*, and enters the first block 12*a*. The first block 12*a* reflects the light traveling in the upward direction (first direction DIR1) toward the right direction (the second direction DIR2 different from the first direction DIR1) on the first reflective surface Sa. The light reflected by the first reflective surface Sa travels in the right direction and exits the first block 12*a* through the right side surface of the first block 12*a*.

In the second path L2, light traveling in the left direction (third direction DIR3) enters the first block 12*a* through the right side surface of the first block 12*a*. The first block 12*a* reflects the light traveling in the left direction (the third direction DIR3 opposite to the second direction DIR2) toward the downward direction (the fourth direction DIR4 opposite to the first direction DIR1) on the first reflective surface Sa. The light reflected by the first reflective surface Sa travels in the downward direction, passes through the first buffer layer 14*a*, the first light absorbing member 16, and the second buffer layer 14*b*, and enters the second block 12*b*. The second block 12*b* reflects the light traveling in the downward direction (fourth direction DIR4) toward the left direction (the sixth direction DIRE opposite to the fifth direction DIR5) on the second reflective surface Sb. The light reflected by the second reflective surface Sb travels in the left direction and exits the second block 12*b* through the left side surface of the second block 12*b*.

[Effects]

With the optical component 10, it is possible to inhibit noise from being mixed in light used for optical communication. More specifically, as for the optical component 10, light appearing as noise is incident on the optical component 10 from the outside of the optical component 10. The wavelength of the light appearing as noise is a wavelength of light used in general optical communication. For example, the wavelength of light used in general optical communication is 850 nm to 1,675 nm. The wavelength of light appearing as noise is, for example, 1,250 nm and/or 1,350 nm. When a laser diode is used and consequently generates heat, the wavelength range of light emitted from the laser diode is widened. For example, when a laser diode emits light having a wavelength of 1,310 nm, the laser diode starts to emit light having a wavelength other than 1,310 nm in addition to the light having a wavelength of 1,310 nm. The light having a wavelength other than 1,310 nm is the light appearing as noise.

The optical component 10 includes the first light absorbing member 16 in order to remove such light appearing as noise. The first light absorbing member 16 contains the first metal ions that absorb light having the first specific wavelength. The first specific wavelength is 1,250 nm or 1,350 nm, which is the wavelength of the light appearing as noise. The first light absorbing member 16 thus absorbs the light appearing as noise. As a result, with the optical component 10, it is possible to inhibit noise from being mixed in light used for optical communication.

Meanwhile, the first metal ions have an effect of increasing the second refractive index n2 of the first light absorbing member 16. The first light absorbing member 16 therefore has the second refractive index n2 different from the first refractive index n1. In this case, when the first light absorbing member 16 is in contact with the first block 12*a*, light is irregularly reflected at the boundary between the first block 12*a* and the first light absorbing member 16. The irregularly reflected light is repeatedly reflected in the first light absorbing member 16 and returns to the first path L1 or the second path L2. When the thickness of the first light absorbing member 16 in the up-down direction decreases, the irregularly reflected light easily returns to the first path L1 or the second path L2. The irregularly reflected light appear as noise.

The optical component 10 therefore includes the first buffer layer 14*a* having the third refractive index n3 having a value between the first refractive index n1 and the second refractive index n2. The first buffer layer 14*a* is in contact with the first light absorbing member 16 and the first block 12*a*. The amount of change in the refractive index at the boundary between the first buffer layer 14*a* and the first light absorbing member 16 is therefore n2-n3. On the other hand, the difference between the second refractive index n2 of the first light absorbing member 16 and the first refractive index n1 of the first block 12*a* is n2-n1. n1 is smaller than n3. Therefore, the amount of change in the refractive index at the boundary between the first buffer layer 14*a* and the first light absorbing member 16 is smaller than the difference between the second refractive index n2 of the first light absorbing member 16 and the first refractive index n1 of the first block 12*a*. An abrupt change in refractive index on the first path L1 and the second path L2 is suppressed. Therefore, irregular reflection is less likely to occur at the boundary between the first buffer layer 14*a* and the first light absorbing member 16.

Similarly, the amount of change in the refractive index at the boundary between the first buffer layer 14*a* and the first block 12*a* is n3-n1. On the other hand, the difference between the second refractive index n2 of the first light absorbing member 16 and the first refractive index n1 of the first block 12*a* is n2-n1. n2 is greater than n3. Therefore, the amount of change in the refractive index at the boundary between the first buffer layer 14*a* and the first block 12*a* is smaller than the difference between the second refractive index n2 of the first light absorbing member 16 and the first refractive index n1 of the first block 12*a*. An abrupt change in refractive index on the first path L1 and the second path L2 is suppressed. Therefore, irregular reflection is less likely to occur at the boundary between the first block 12*a* and the first buffer layer 14*a* and the boundary between the first light absorbing member 16 and the first buffer layer 14*a*. Since irregular reflection of light is suppressed, generation of noise is suppressed. As described above, with the optical component 10, it is possible to inhibit noise from being mixed in light used for optical communication.

The optical component 10 includes the second buffer layer 14*b*. With this structure, it is possible to inhibit noise from being mixed in light used for optical communication for the same reason as described above.

The optical component 10 can inhibit noise from being mixed in light used for optical communication for the following reasons. In the first buffer layer 14*a* in the optical component 10, the concentration of the first metal ions decreases as approaching the first block 12*a* in the upward direction (first direction DIR1). The third refractive index n3 thus decreases toward the first block 12*a* in the upward direction. An abrupt change in refractive index on the first path L1 and the second path L2 is thus suppressed. As a result, irregular reflection is less likely to occur at the boundary between the first block 12*a* and the first light absorbing member 16. In the optical component 10, since irregular reflection of light is suppressed, generation of noise is suppressed. As described above, with the optical component 10, it is possible to inhibit noise from being mixed in light used for optical communication.

In the optical component 10, the thickness (size) of the first buffer layer 14*a* in the up-down direction (first direction DIR1) is longer than the first specific wavelength. As a result, the light irregularly reflected in the first buffer layer 14*a* is reduced. For the same reason, the light irregularly reflected in the second buffer layer 14*b* is reduced. Therefore, in the first buffer layer 14*a* and the second buffer layer 14*b*, the probability that the irregularly reflected light returns to the first path L1 and the second path L2 decreases. With the optical component 10, it is possible to inhibit noise from being mixed in light used for optical communication.

In the optical component 10, the thickness (size) of the first light absorbing member 16 in the up-down direction (first direction DIR1) is smaller than the wavelength of light passing through the first light absorbing member 16 in light traveling in the upward direction (first direction DIR1) or light traveling in the downward direction (fourth direction DIR4). As a result, the light reflected on the upper main surface of the first light absorbing member 16 and the light reflected on the lower main surface of the first light absorbing member 16 hardly interfere with each other. That is, a standing wave is less likely to be generated between the upper main surface of the first light absorbing member 16 and the lower main surface of the first light absorbing member 16. As a result, the light is inhibited from returning to the laser diode, and the oscillation of the laser diode is inhibited from becoming unstable.

In the optical component 10, the first refractive index n1 of the first block 12*a* is lower than the second refractive index n2 of the first light absorbing member 16 and the third refractive index n3 of the first buffer layer 14*a*. As a result, in the first path L1, the light irregularly reflected by the first block 12*a* enters the first light absorbing member 16 without being reflected at the boundary between the first block 12*a* and the first buffer layer 14*a* or the boundary between the first buffer layer 14*a* and the first light absorbing member 16. As a result, the light is inhibited from returning to the laser diode, and the transmission of the laser diode is inhibited from becoming unstable.

In the optical component 10, the glass included in the material of the first block 12*a*, the glass included in the material of the second block 12*b*, the glass included in the material of the first buffer layer 14*a*, the glass included in the material of the second buffer layer 14*b*, and the glass included in the material of the first light absorbing member 16 are glasses having the same composition. Therefore, the optical component 10 has a symmetrical structure in the up-down direction. As a result, the mechanical strength of the optical component 10 is improved, and the heat resistance of the optical component 10 is improved.

(First Modification)

Figure 3:
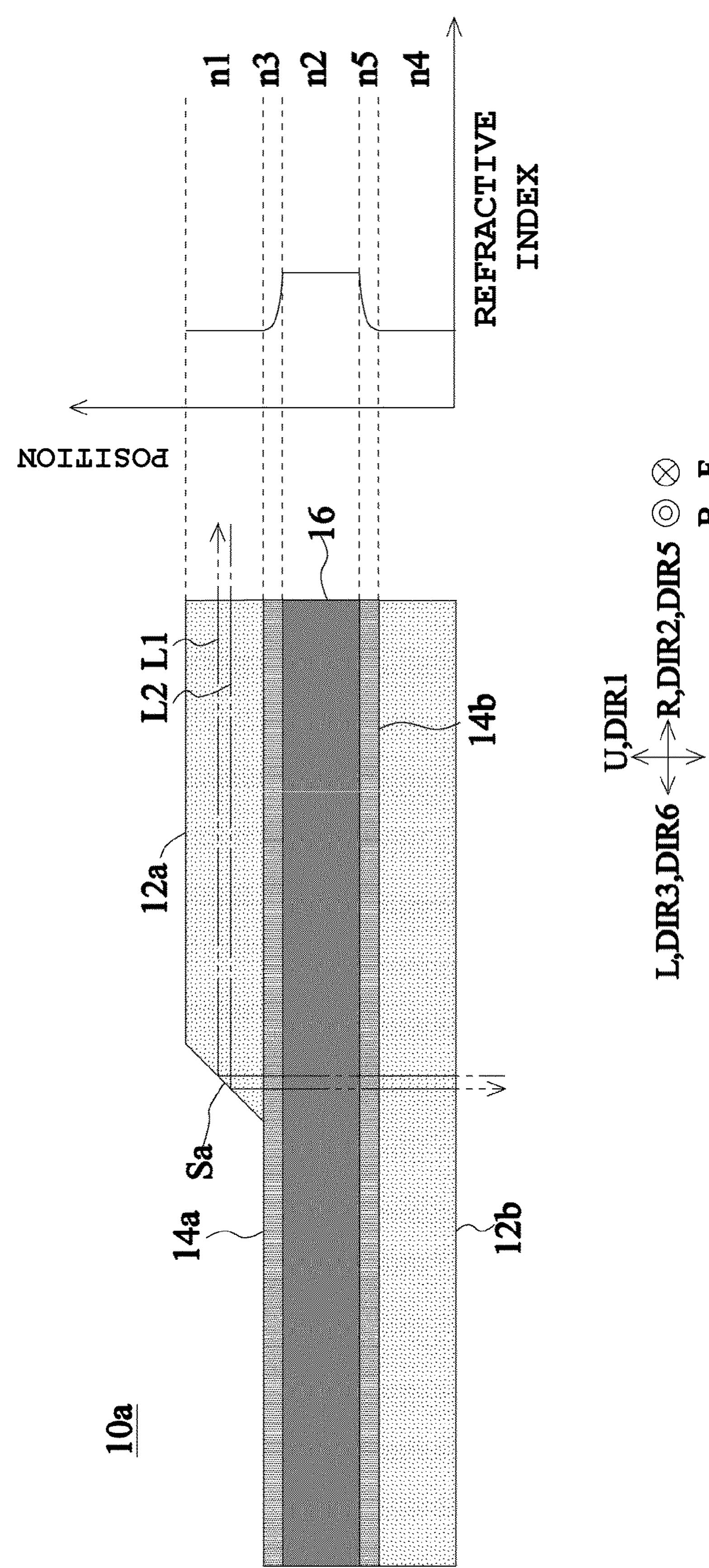
FIG. 3 is a sectional view of an optical component 10*a*.

Hereinafter, an optical component 10*a* according to a first modification will be described with reference to the drawings. FIG. 3 is a sectional view of the optical component 10*a*.

The optical component 10*a* differs from the optical component 10 in the structure of the second block 12*b*. In the optical component 10*a*, the second block 12*b* does not have the second reflective surface Sb. That is, the second block 12*b* has a plate shape having an upper main surface and a lower main surface. Other structures of the optical component 10*a* are the same as those of the optical component 10, and thus description thereof is omitted. Hereinafter, the first path L1 and the second path L2 of the optical component 10*a* will be described.

In the first path L1, light traveling in the upward direction (first direction DIR1) enters the second block 12*b* through the lower main surface of the second block 12*b*. The light traveling in the upward direction passes through the second buffer layer 14*b*, the first light absorbing member 16, and the first buffer layer 14*a* and enters the first block 12*a*. The first block 12*a* reflects the light traveling in the upward direction (first direction DIR1) toward the right direction (the second direction DIR2 different from the first direction DIR1) on the first reflective surface Sa. The light reflected by the first reflective surface Sa travels in the right direction and exits the first block 12*a* through the right side surface of the first block 12*a*.

In the second path L2, light traveling in the left direction (third direction DIR3) enters the first block 12*a* through the right side surface of the first block 12*a*. The first block 12*a* reflects the light traveling in the left direction (the third direction DIR3 opposite to the second direction DIR2) toward the downward direction (the fourth direction DIR4 opposite to the first direction DIR1) on the first reflective surface Sa. The light reflected by the first reflective surface Sa travels in the downward direction, passes through the first buffer layer 14*a*, the first light absorbing member 16, the second buffer layer 14*b*, and the second block 12*b*, and is emitted from the second block 12*b*.

With the optical component 10*a* as described above, it is possible to provide the same action and effect as those of the optical component 10.

(Second Modification)

Figure 4:
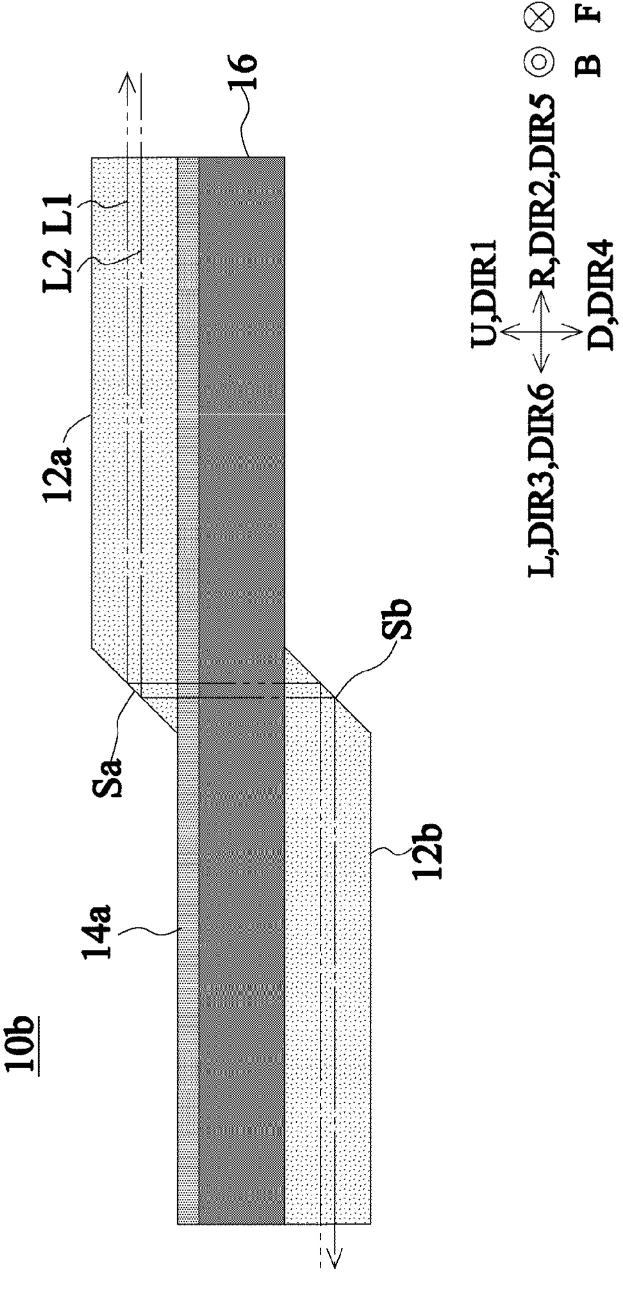
FIG. 4 is a sectional view of an optical component 10*b*.

Hereinafter, an optical component 10*b* according to a second modification will be described with reference to the drawings. FIG. 4 is a sectional view of the optical component 10*b*.

The optical component 10*b* is different from the optical component 10 in that the second buffer layer 14*b* is not provided. Other structures of the optical component 10*b* are the same as those of the optical component 10, and thus description thereof is omitted. With the optical component 10*b*, it is possible to provide the same action and effect as those of the optical component 10.

(Third Modification)

Figure 5:
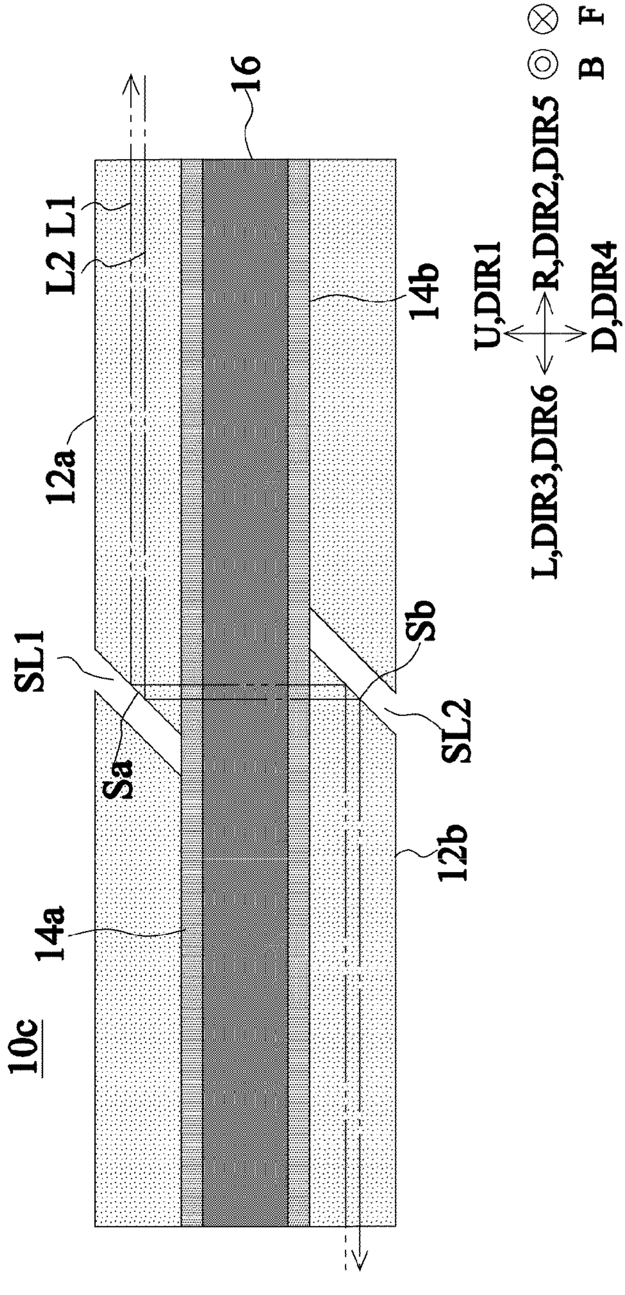
FIG. 5 is a sectional view of an optical component 10*c*.

Hereinafter, an optical component 10*c* according to a third modification will be described with reference to the drawings. FIG. 5 is a sectional view of the optical component 10*c*.

The optical component 10*c* differs from the optical component 10 in the structure of the first block 12*a* and the structure of the second block 12*b*. More specifically, the first block 12*a* has a rectangular shape having the same shape as the first buffer layer 14*a*, the first light absorbing member 16, and the second buffer layer 14*b* when viewed in the up-down direction. However, a first slit SL1 is provided at the center of the first block 12*a* in the left-right direction. The first slit SL1 extends from the upper main surface of the first block 12*a* to the lower main surface of the first block 12*a*. The first slit SL1 forms an angle of 45 degrees with respect to the up-down direction such that the upper end of the first slit SL1 is located to the right of the lower end of the first slit SL1. The first block 12*a* thus has the first reflective surface Sa. Such a first slit SL1 is formed by cutting with a dicer or etching.

The second block 12*b* has a rectangular shape having the same shape as the first buffer layer 14*a*, the first light absorbing member 16, and the second buffer layer 14*b* when viewed in the up-down direction. However, a second slit SL2 is provided at the center of the second block 12*b* in the left-right direction. The second slit SL2 extends from the lower main surface of the second block 12*b* to the upper main surface of the second block 12*b*. The second slit SL2 forms an angle of 45 degrees with respect to the up-down direction such that the lower end of the second slit SL2 is located to the left of the upper end of the second slit SL2. The second block 12*b* thus has the second reflective surface Sb. Such a second slit SL2 is formed by cutting with a dicer or etching. Other structures of the optical component 10*c* are the same as those of the optical component 10, and thus description thereof is omitted. With the optical component 10*c*, it is possible to provide the same action and effect as those of the optical component 10.

The method for forming the first buffer layer 14*a* and the second buffer layer 14*b* in the optical component 10*c* is different from the method for forming the first buffer layer 14*a* and the second buffer layer 14*b* in the optical component 10. More specifically, a plurality of first green sheets containing the first metal ions are stacked in the up-down direction. Then, a plurality of second green sheets containing no first metal ions are stacked above the first green sheets. Further, a plurality of third green sheets containing no first metal ions are stacked below the first green sheets. Thus, an unfired stacked body is obtained. When the unfired stacked body is fired, the first metal ions in the first green sheets are diffused into the second green sheets in the vicinity of the first green sheets and into the third green sheets in the vicinity of the first green sheets. As a result, the second green sheets in which the first metal ions have been diffused become the first buffer layer 14*a*. The third green sheets in which the first metal ions have been diffused become the second buffer layer 14*b*. The second green sheets in which the first metal ions have not been diffused become the first block 12*a*. The third green sheets in which the first metal ions have not been diffused become the second block 12*b*. Finally, the first slit SL1 is formed in the first block 12*a*. The second slit SL2 is formed in the second block 12*b*. As described above, the optical component 10*c* is produced by stacking a plurality of green sheets to form an unfired stacked body and firing the unfired stacked body. The bonding strength of the first block 12*a*, the second block 12*b*, the first buffer layer 14*a*, the second buffer layer 14*b*, and the first light absorbing member 16 is thus improved. In addition, changes in the third refractive index n3 and the fifth refractive index n5 become continuous changes.

(Fourth Modification)

Figure 6:
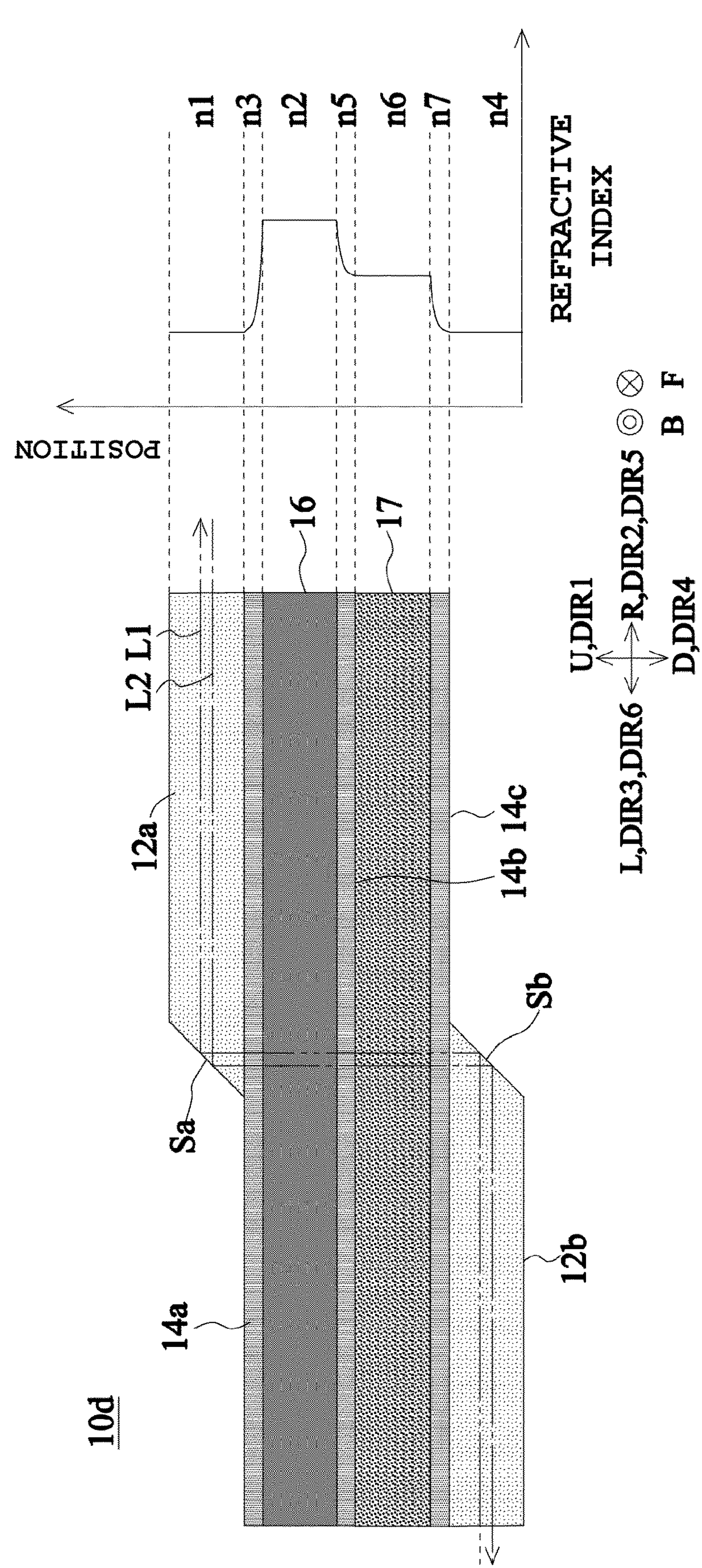
FIG. 6 is a sectional view of an optical component 10*d*.

Hereinafter, an optical component 10*d* according to a fourth modification will be described with reference to the drawings. FIG. 6 is a sectional view of the optical component 10*d*.

The optical component 10*d* is different from the optical component 10 in that a third buffer layer 14*c* and a second light absorbing member 17 are further included. The second light absorbing member 17 contains second metal ions that absorb light having a second specific wavelength different from the first specific wavelength. The second light absorbing member 17 has a sixth refractive index n6. The sixth refractive index n6 is different from the fourth refractive index n4. In the present embodiment, the sixth refractive index n6 is larger than the fourth refractive index n4. The sixth refractive index n6 is smaller than the second refractive index n2. Other structures of the second light absorbing member 17 are the same as those of the first light absorbing member 16, and thus description thereof is omitted.

The second buffer layer 14*b* has the fifth refractive index n5. The fifth refractive index n5 has a value between the second refractive index n2 and the sixth refractive index n6. The third buffer layer 14*c* has a seventh refractive index n7. The seventh refractive index n7 has a value between the fourth refractive index n4 and the sixth refractive index n6.

In the optical component 10*d* as described above, the second block 12*b*, the third buffer layer 14*c*, the second light absorbing member 17, the second buffer layer 14*b*, the first light absorbing member 16, the first buffer layer 14*a*, and the first block 12*a* are arranged in this order in the upward direction (first direction DIR1). The second buffer layer 14*b* is in contact with the first light absorbing member 16 and the second light absorbing member 17. The third buffer layer

14c is in contact with the second light absorbing member 17 and the second block 12b. Other structures of the optical component 10d are the same as those of the optical component 10, and thus description thereof is omitted. With the optical component 10d, it is possible to provide the same action and effect as those of the optical component 10.

The optical component 10d includes the first light absorbing member 16 and the second light absorbing member 17. The first light absorbing member 16 contains the first metal ions that absorb light having the first specific wavelength. The second light absorbing member 17 contains the second metal ions that absorb light having the second specific wavelength. As a result, the optical component 10d can absorb light having a plurality of types of wavelengths.

(Fifth Modification)

Figure 7:
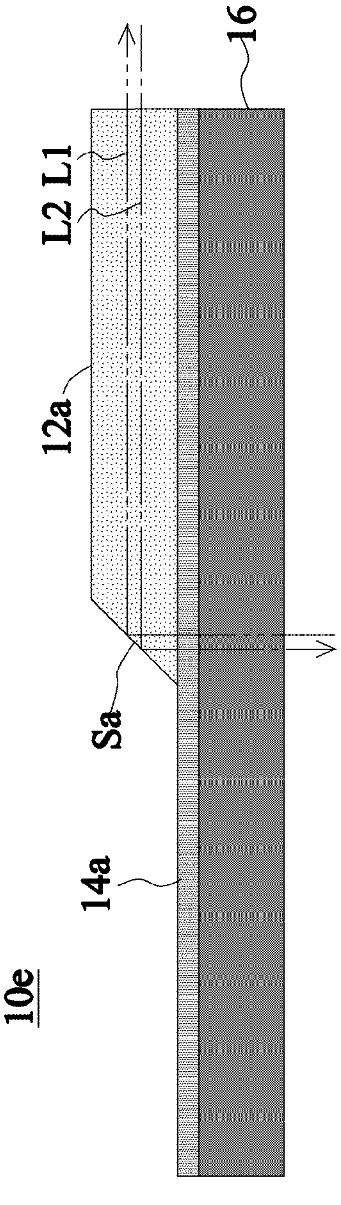
FIG. 7 is a sectional view of an optical component 10*e*.
Figure 7:
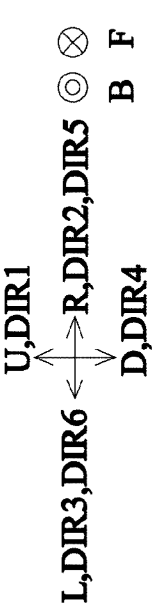

Hereinafter, an optical component 10e according to a fifth modification will be described with reference to the drawings. FIG. 7 is a sectional view of the optical component 10e.

The optical component 10e is different from the optical component 10a in that the second block 12b and the second buffer layer 14b are not provided. The first light absorbing member 16, the first buffer layer 14a, and the first block 12a are arranged in this order in the upward direction (first direction DIR1). Other structures of the optical component 10e are the same as those of the optical component 10a, and thus description thereof is omitted. With the optical component 10e, it is possible to provide the same action and effect as those of the optical component 10a.

(Sixth Modification)

Figure 8:
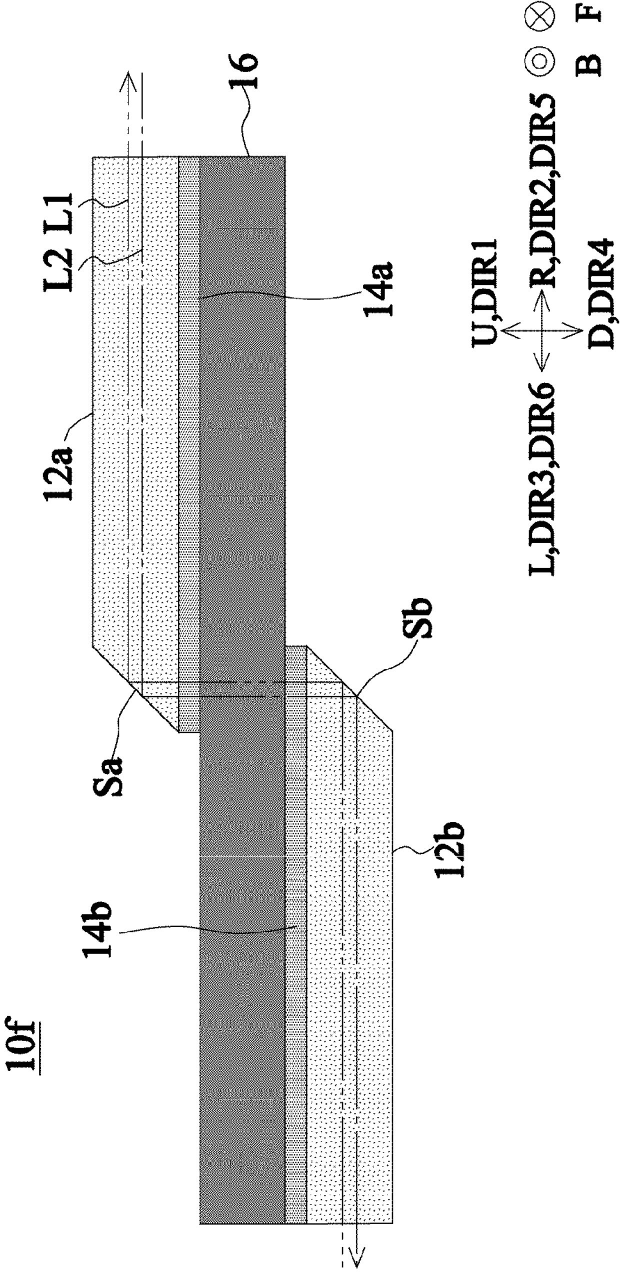
FIG. 8 is a sectional view of an optical component 10*f*.

Hereinafter, an optical component 10f according to a sixth modification will be described with reference to the drawings. FIG. 8 is a sectional view of the optical component 10f.

The optical component 10f is different from the optical component 10 in the shape of the first buffer layer 14a and the shape of the second buffer layer 14b. The first buffer layer 14a overlaps the first block 12a when viewed in the up-down direction. However, the first buffer layer 14a does not protrude from the first block 12a when viewed in the up-down direction. The second buffer layer 14b overlaps the second block 12b when viewed in the up-down direction. However, the second buffer layer 14b does not protrude from the second block 12b when viewed in the up-down direction. Other structures of the optical component 10f are the same as those of the optical component 10, and thus description thereof is omitted. With the optical component 10f, it is possible to provide the same action and effect as those of the optical component 10.

Other Embodiments

The optical component according to the present invention is not limited to the optical components 10 and 10a to 10f and can be modified within the scope of the gist thereof. In addition, the structures of the optical components 10 and 10a to 10f may be freely combined.

The first metal ions and the second metal ions may be, for example, rare earth ions such as Y, La, Ce, Nd, Pr, Sm, Eu, Gd, Tb, Dy, Ho, Er, Tm, and Lu. The first metal ions and the second metal ions may be alkali metal ions or alkaline earth metal ions. In this case, the material of the first light absorbing member 16 and the material of the second light absorbing member 17 are a mixture of alumina, silica, or borosilicate glass having different transmission characteristics in a short wavelength region and alkali metal ions or alkaline earth metal ions. At this time, the mixing ratio between alumina, silica, or borosilicate glass and alkali metal ions or alkaline earth metal ions in the material of the first light absorbing member 16 and the material of the second light absorbing member 17 is different from the mixing ratio between alumina, silica, or borosilicate glass and alkali metal ions or alkaline earth metal ions in the material of the first block 12a and the material of the second block 12b.

Note that the third refractive index n3 of the first buffer layer 14a may discontinuously change. For example, the third refractive index n3 of the first buffer layer 14a may change stepwise. The third refractive index n3 of the first buffer layer 14a may take on one value larger than the first refractive index n1 and smaller than the second refractive index n2.

Note that the fifth refractive index n5 of the second buffer layer 14b may discontinuously change. For example, the fifth refractive index n5 of the second buffer layer 14b may change stepwise. In the optical components 10, 10a, 10c, and 10f, the fifth refractive index n5 of the second buffer layer 14b may take on one value larger than the fourth refractive index n4 and smaller than the second refractive index n2. In the optical component 10d, the fifth refractive index n5 of the second buffer layer 14b may take on one value larger than the sixth refractive index n6 and smaller than the second refractive index n2.

Note that the seventh refractive index n7 of the third buffer layer 14c may discontinuously change. For example, the seventh refractive index n7 of the third buffer layer 14c may change stepwise. In the optical component 10d, the seventh refractive index n7 of the third buffer layer 14c may take on one value larger than the fourth refractive index n4 and smaller than the sixth refractive index n6.

The first block 12a and the second block 12b may be formed by a float method. The first block 12a and the second block 12b may be produced by firing a slurry that is a mixture of fritted glass and a binder.

The first light absorbing member 16 and the second light absorbing member 17 may be formed by a float method separately from the first block 12a and the second block 12b. The first light absorbing member 16 and the second light absorbing member 17 may be produced by firing a slurry that is a mixture of fritted glass and a binder.

The glass included in the material of the first block 12a, the glass included in the material of the second block 12b, the glass included in the material of the first buffer layer 14a, the glass included in the material of the second buffer layer 14b, and the glass included in the material of the first light absorbing member 16 may be glasses having different compositions.

The first block 12a and the second block 12b may be produced by molding molten glass with a mold.

The first buffer layer 14a, the second buffer layer 14b, and the third buffer layer 14c may be produced by stacking and firing a plurality of green sheets. At this time, since the material compositions of the green sheets are different from each other, the sheets after firing have different refractive indices. As a result, the first buffer layer 14a, the second buffer layer 14b, and the third buffer layer 14c respectively have the third refractive index n3, the fifth refractive index n5, and the seventh refractive index n7 that each continuously change.

When the laser diode emits light having a wavelength of 1,310 nm, the first light absorbing member 16 may absorb light having a wavelength of 1,310 nm. As a result, the light irregularly reflected in the first light absorbing member 16 is absorbed by the first light absorbing member 16. However, in the first light absorbing member 16, the optical absorption coefficient of light used for optical communication to which the optical components 10 and 10*a* to 10*f* are applied is smaller than the optical absorption coefficient of light having a wavelength different from that of the light used for optical communication to which the optical components 10 and 10*a* to 10*f* are applied. In this case, the first metal ions include two or more kinds of metal ions. For the same reason, when the laser diode emits light having a wavelength of 1,310 nm, the second light absorbing member 17 may absorb light having a wavelength of 1,310 nm.

The first direction DIR1 and the second direction DIR2 form a right angle. However, the first direction DIR1 and the second direction DIR2 may not form a right angle. The third direction DIR3 and the fourth direction DIR4 form a right angle. However, the third direction DIR3 and the fourth direction DIR4 may not form a right angle. The fifth direction DIR5 and the first direction DIR1 form a right angle. However, the fifth direction DIR5 and the first direction DIR1 may not form a right angle. The fourth direction DIR4 and the sixth direction DIR6 form a right angle. However, the fourth direction DIR4 and the sixth direction DIR6 may not form a right angle.

The second direction DIR2 and the fifth direction DIR5 may not coincide with each other. The third direction DIR3 and the sixth direction DIR6 may not coincide with each other.

The first buffer layer 14*a*, the second buffer layer 14*b*, and the third buffer layer 14*c* may not contain the first metal ions or the second metal ions.

In the optical components 10, 10*a* to 10*c*, 10*e*, and 10*f*, the first refractive index n1 may be larger than the second refractive index n2. The fourth refractive index n4 may be larger than the second refractive index n2.

In the optical component 10*d*, the first refractive index n1 may be larger than the second refractive index n2. The sixth refractive index n6 may be larger than the second refractive index n2. The fourth refractive index n4 may be larger than the sixth refractive index n6.

Similarly to the optical component 10*c*, the optical components 10, 10*a*, 10*b*, and 10*d* to 10*f* may also be produced by stacking green sheets.

DESCRIPTION OF REFERENCE SYMBOLS

10, 10*a* to 10*f*: Optical component
12*a*: First block
12*b*: Second block
14*a*: First buffer layer
14*b*: Second buffer layer
14*c*: Third buffer layer
16: First light absorbing member
17: Second light absorbing member
L1: First path
L2: Second path
SL1: First slit
SL2: Second slit
Sa: First reflective surface
Sb: Second reflective surface

The invention claimed is:

1. An optical component comprising:

a first block having a first refractive index and having a first reflective surface;

a first light absorbing member containing a first metal ion that absorbs light having a first specific wavelength, the first light absorbing member having a second refractive index different from the first refractive index; and a first buffer layer between and in contact with each of the first light absorbing member and the first block, the first buffer layer having a third refractive index having a value between the first refractive index and the second refractive index, wherein the first light absorbing member, the first buffer layer, and the first block are arranged in this order in a first direction such that the first block reflects light traveling in the first direction in a second direction different from the first direction on the first reflective surface, or the first block reflects light traveling in a third direction opposite to the second direction in a fourth direction opposite to the first direction on the first reflective surface.

2. The optical component according to claim 1, wherein the second refractive index is larger than the first refractive index, and the third refractive index is larger than the first refractive index and smaller than the second refractive index.

3. The optical component according to claim 2, further comprising:

a second block having a fourth refractive index different from the second refractive index; and a second buffer layer having a fifth refractive index having a value between the fourth refractive index and the second refractive index, wherein the second block, the second buffer layer, the first light absorbing member, the first buffer layer, and the first block are arranged in this order in the first direction, and the second buffer layer is in contact with the first light absorbing member and the second block.

4. The optical component according to claim 3, wherein the second block has a second reflective surface, and the second block reflects light traveling in a fifth direction different from the first direction in the first direction on the second reflective surface, or the second block reflects light traveling in the fourth direction in a sixth direction opposite to the fifth direction on the second reflective surface.

5. The optical component according to claim 4, wherein the second block reflects the light traveling in the fifth direction different from the first direction in the first direction on the second reflective surface.

6. The optical component according to claim 4, wherein the second block reflects the light traveling in the fourth direction in the sixth direction opposite to the fifth direction on the second reflective surface.

7. The optical component according to claim 1, further comprising:

a second block having a fourth refractive index different from the second refractive index; and a second buffer layer having a fifth refractive index having a value between the fourth refractive index and the second refractive index, wherein the second block, the second buffer layer, the first light absorbing member, the first buffer layer, and the first block are arranged in this order in the first direction, and the second buffer layer is in contact with the first light absorbing member and the second block.

8. The optical component according to claim 7, wherein the second block has a second reflective surface, and the second block reflects light traveling in a fifth direction different from the first direction in the first direction on the second reflective surface, or the second block reflects light traveling in the fourth direction in a sixth direction opposite to the fifth direction on the second reflective surface.

9. The optical component according to claim 8, wherein the second block reflects the light traveling in the fifth direction different from the first direction in the first direction on the second reflective surface.

10. The optical component according to claim 8, wherein the second block reflects the light traveling in the fourth direction in the sixth direction opposite to the fifth direction on the second reflective surface.

11. The optical component according to claim 2, further comprising:

a second block having a fourth refractive index;

a second light absorbing member containing a second metal ion configured to absorb light having a second specific wavelength different from the first specific wavelength, the second light absorbing member having a sixth refractive index;

a second buffer layer having a fifth refractive index; and a third buffer layer having a seventh refractive index, wherein the sixth refractive index is different from the fourth refractive index, the fifth refractive index has a value between the second refractive index and the sixth refractive index, the seventh refractive index has a value between the fourth refractive index and the sixth refractive index, the second block, the third buffer layer, the second light absorbing member, the second buffer layer, the first light absorbing member, the first buffer layer, and the first block are arranged in this order in the first direction, the second buffer layer is in contact with the first light absorbing member and the second light absorbing member, and the third buffer layer is in contact with the second light absorbing member and the second block.

12. The optical component according to claim 1, further comprising:

a second block having a fourth refractive index;

a second light absorbing member containing a second metal ion configured to absorb light having a second specific wavelength different from the first specific wavelength, the second light absorbing member having a sixth refractive index;

a second buffer layer having a fifth refractive index; and a third buffer layer having a seventh refractive index, wherein the sixth refractive index is different from the fourth refractive index, the fifth refractive index has a value between the second refractive index and the sixth refractive index, the seventh refractive index has a value between the fourth refractive index and the sixth refractive index, the second block, the third buffer layer, the second light absorbing member, the second buffer layer, the first light absorbing member, the first buffer layer, and the first block are arranged in this order in the first direction, the second buffer layer is in contact with the first light absorbing member and the second light absorbing member, and the third buffer layer is in contact with the second light absorbing member and the second block.

13. The optical component according to claim 1, wherein the first buffer layer contains the first metal ion.

14. The optical component according to claim 13, wherein a concentration of the first metal ion in the first buffer layer decreases toward the first block in the first direction.

15. The optical component according to claim 1, wherein a size of the first buffer layer in the first direction is longer than the first specific wavelength.

16. The optical component according to claim 1, wherein a size of the first light absorbing member in the first direction is shorter than a wavelength of light passing through the first light absorbing member in light traveling in the first direction or light traveling in the fourth direction.

17. The optical component according to claim 1, wherein the first specific wavelength is a wavelength of light used in optical communication.

18. The optical component according to claim 1, wherein the first metal ion has an absorption spectrum in a visible light region.

19. The optical component according to claim 1, wherein the first light absorbing member, the first buffer layer, and the first block are arranged in the first direction such that the first block reflects the light traveling in the first direction in the second direction different from the first direction on the first reflective surface.

20. The optical component according to claim 1, wherein the first light absorbing member, the first buffer layer, and the first block are arranged in the first direction such that the first block reflects the light traveling in the third direction opposite to the second direction in the fourth direction opposite to the first direction on the first reflective surface.

* * * * *